R. L. SMITH.
PORTABLE ELECTRIC SEARCH LIGHT.
APPLICATION FILED SEPT. 18, 1914.
1,170,012. Patented Feb. 1, 1916.
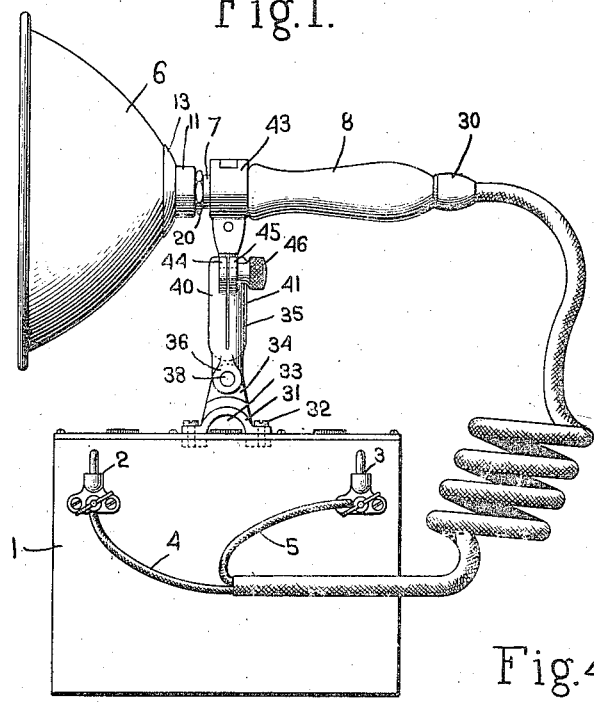
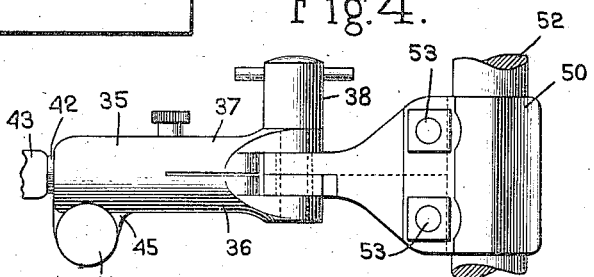
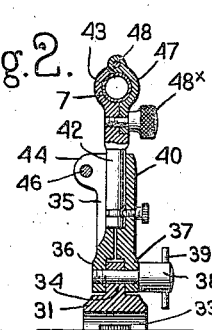
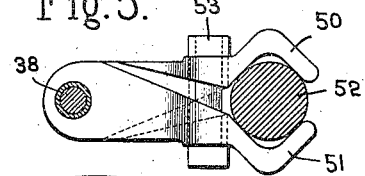
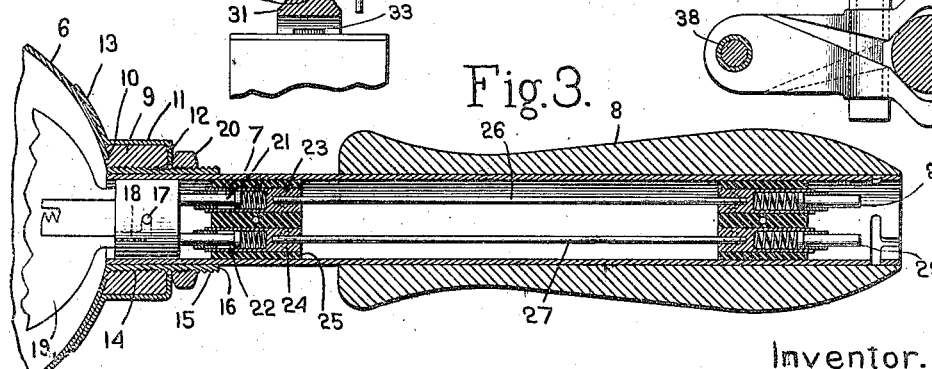
Witnesses.
J. Morrill Fuller
William E. Gagen
Inventor.
Roland L. Smith,
by Heard Smith & Tennant.
Atty's.

UNITED STATES PATENT OFFICE.

ROLAND L. SMITH, OF EVERETT, MASSACHUSETTS.

PORTABLE ELECTRIC SEARCH-LIGHT.

1,170,012.  Specification of Letters Patent.  Patented Feb. 1, 1916.

Application filed September 18, 1914. Serial No. 862,406.

*To all whom it may concern:*

Be it known that I, ROLAND L. SMITH, a citizen of the United States, and resident of Everett, county of Middlesex, State of Massachusetts, have invented an Improvement in Portable Electric Search-Lights, of which the following description, in connection with the accompanying drawing, is a specification, like characters on the drawing representing like parts.

This invention relates to improvements in portable electric search lights adapted for a variety of uses, such as for automobiles, motor boats, fire departments, signaling lights, etc.

The general object of the invention is to provide a light and powerful search light apparatus which can easily be carried by hand and in which the light may be pointed in any direction so that it may be used upon an automobile or a motor boat and may be easily tilted downwardly or laterally when passing another automobile or boat so as to avoid flashing the light into the eyes of the pilot of the other machine; which may be used to light a room by directing the same toward the ceiling so that the light will be reflected and diffused in such a manner as to enable a person to read or to work in any portion of the room.

In order to accomplish the above purposes one of the specific objects of the invention resides in providing a supporting means for the signal lamp, preferably an electric lamp, which will permit it to be turned in any direction and which will retain the same in the position to which it is adjusted notwithstanding jolts or jars which may be given to the supporting object.

Another object of the invention is to provide means whereby the light may be detached from its supporting member and used as a hand lamp either for signaling or for investigating surrounding conditions or which when used upon an automobile or boat may be carried about and used as a hand lamp to aid in repairing the machine, or for firemen in exploring a smoke filled room.

Another object of the invention is to provide a search light of the character described having a single shell reflector with a rigid handle having connections therefrom to the reflector of the search light which will not be easily broken by rough usage.

Another object of the invention is to provide a support for the search light comprising pivotal jaws having free ends adapted to engage a supporting edge such as the frame of the wind shield of an automobile.

Other objects of the invention will more fully appear from the following description and accompanying drawings and will be pointed out in the annexed claims.

In the drawings: Figure 1 is an elevation of one of the preferred forms of search light apparatus embodying my invention, Fig. 2 is a vertical sectional view of one of the preferred forms of adjustable support for the search light, Fig. 3 is a vertical axial sectional view of the search light and the stem or handle by which it may be manipulated, Fig. 4 is a detail view of a modified form of support showing clamping members adapting the support to be attached to the wind shield of an automobile or similar device and, Fig. 5 is a median transverse sectional view of the clamp illustrated in Fig. 4.

The portable apparatus disclosed in the accompanying drawings comprises a suitable reservoir or source of energy flexibly connected with the incandescent member of the search light. In the preferred embodiment disclosed herein the source of energy preferably comprises a storage battery 1, the terminals 2 and 3 of which are connected by suitable conductors 4 and 5 to the incandescent filament of an electric lamp located axially of a suitable reflector 6 which preferably is paraboloidal in form, the incandescent member being located at the focus of the parabola. Conduits desirably may pass through a cylindrical stem 7 extending rearwardly from said reflector and said stem may be desirably provided with a handle 8 of wood, vulcanite or other suitable material.

Considerable difficulty has heretofore been experienced in providing suitable means for attaching together the stem and the reflector of the character disclosed herein for the reason that the reflector is relatively thin and the joint between the reflector and the stem when brazed, soldered or otherwise secured is likely to become easily broken when the device is being handled. In order to obviate this difficulty the reflector 6 is desirably constructed of spun brass and is silvered on the inner surface in the usual manner and is supported as follows: A circular aperture is formed in the reflector preferably at the rear thereof and the walls of said aperture are secured to a relatively thick collar 9 having a recess 10 formed to receive the edge of said wall, the inner end of said collar being provided with a surface curved to form an extension of the paraboloidal surface of the reflector.

The collar 9 is desirably surrounded by a sleeve 11 having flanges 12 inclosing the outer end of the collar 9 and the flange 13 being concaved to fit the outer surface of the reflector. The reflector 6, the collar 9, and the sleeve 11 with its flanges 12 and 13 desirably may be brazed or soldered to form a substantially integral structure. The interior of the collar 9 is preferably provided with screw threads 14 adapted to engage corresponding screw threads 15 carried by a sleeve 16 which is brazed, sweated or pinned upon the end of the cylindrical stem 7. The stem 7 is provided with a stud 17 adapted to engage a bayonet joint 18 in the side of the socket of an electric bulb 19. By reason of the above construction a very strong joint is made between the reflector 6 and the stem 7, and the stem 7 is adjustable relatively to the reflector by reason of the screw threaded connection between its sleeve 16 and the collar 9 of the reflector so that the incandescent filament may be positioned or focused in respect to the focus of the paraboloidal reflector. When thus positioned it may be secured permanently by means of a check nut 20 upon the sleeve 16 which may be set up tightly against the flange 12.

Suitable connections for the electric current may be provided near the stem or handle member aforesaid. As illustrated herein spring pressed terminals 21, 22, engage the terminals of the incandescent filament and are slidably mounted within suitable members 23, 24 which are inclosed within the non conducting plug 25 permanently fastened within the stem 7. The terminals 21, 22 are so positioned that when the electric light is secured within the stem the incandescent member connects at its ends with the respective terminals. Suitable conductors 26, 27, may lead from the members 23, 24 to similar terminals 28, 29 adjacent to the opposite ends of the stem or handle and a suitable switch 30 may be provided in the end of the handle by which the ends of the electric circuit may be connected to the terminals 28 and 29 aforesaid.

By the use of an electric storage battery such as illustrated herein, and which desirably may comprise three cells, a sufficiently powerful current may be obtained to produce a very powerful light within the reflector, and in actual experiments it is found that the rays of a light of this character may be thrown a distance of about 2000 feet, the rays being sufficiently strong also to penetrate the smoke of a burning building or to be used as a signaling device.

In order to provide a compact portable apparatus the reflector may be mounted upon the top of the battery as illustrated in Fig. 1, and it is desirable that the search light may be so mounted upon its battery or other support that it will be capable of being pointed in any direction so that the apparatus may be merely set into a convenient bracket or holder and be adapted for use instantly.

In one of the preferred forms of apparatus which is illustrated in Fig. 1 a stand 31 is secured by suitable bolts or screws 32 to the top of the storage battery casing. The stand 31 may if desired be provided with a semi-cylindrical recess 33 adapting said stand to form one half of a clamp which may be secured to a cylindrical rod or other support such for example as a bracket upon an automobile wind shield frame, to the handle bar of a motorcycle or a suitable bracket upon a motor boat, etc.

The stand 31 is desirably provided with an upstanding ear 34 upon which a member 35 preferably bifurcated at its lower end to form legs 36, 37 may be secured by a pivotal member 38 such as a screw having a handle or milled nut 39 by means of which the legs 36, 37 may be clamped firmly upon the ear 34. The upper end of the member 35 is desirably slotted and provided with an axial aperture adapted to receive the stem 42 of a suitable clamp 43. The sides 40, 41 of the slotted portion may be provided with ears 44, 45 which may be connected by a screw 46 so that the sides 40, 41 may be clamped upon the rod 42 with any desired pressure.

In order to provide an easily detachable means for holding the search light the clamping member 43 is desirably made of two semi-cylindrical parts, one of which is secured to the same by a pivot 48, the free end of the member 47 being secured to the member 43 by means of a milled screw 48ˣ which can be readily unscrewed to permit the removal of the stem 7 of the search light.

By the construction above described it will be obvious that any desired vertical adjustment of the search light may be obtained by moving the member 35 about its pivot 38 and that any lateral adjustment may be made by rotating the search light upon its swivel 42 so that the search light is universally adjustable in respect to its supporting stand.

By reason of the fact that there is a great demand for the use of lights of this character in connection with automobiles I have devised an improved clamp by means of which the adjustable support for the search light may be readily secured to a supporting member such as the cylindrical bar of the wind shield of an automobile. This device is illustrated in Fig. 4 in which the member 35 instead of being hinged to a bracket of the form illustrated in Fig. 1 is provided with a pair of jaws 50, 51 having angular faces, said jaws being pivoted upon the screw 38 aforesaid, the jaws 50 and 51 are adapted to be clamped upon the wind shield 52 or other object by bolts 53 passing through said jaws intermediate of the ends thereof and the pivot 38 of the jaws. By reason of this connection the search light support may be easily attached, either to the wind shield or any other convenient form of supporting bar, the spaces between the ends of the jaws being adapted to permit its attachment to the wind shield without interfering with the glass thereof.

It will be obvious that when the searchlight support above described is secured to the wind shield the hinged member 35 will extend a sufficient distance beyond the edge of the wind shield to permit a free adjustment of the searchlight in any direction. When this form of support for the searchlight is used the storage battery may be located conveniently upon the running board or other accessible part of the machine, or attached to the regular generating system of the machine, boat or motorcycle. When it is desired to use the lamp apart from its support it may be easily removed by merely unscrewing the screw 48 and throwing the clamp upwardly. The searchlight can then be transported to any place within the radius of the conductors 4, 5, leading from the battery to the light so that it may be used by hand in any desired manner as for example to examine the mechanism of the automobile or boat or to investigate objects at a distance.

When used by firemen the assembled apparatus may be conveniently carried in a suitable bracket or pocket in the engine truck from which it can be readily and speedily removed by the firemen upon reaching the fire. The search or signal light may then if desired be detached from its clamp and used as a hand lamp the storage battery being carried by the firemen in any suitable sling. Ordinarily the searchlight would be used when left in the bracket and either carried as a lantern with the rays directing in any direction or left on the floor of buildings or the ground with the search light so turned that the rays strike the ceiling of the room thereby lighting the entire room by reflection from said ceiling, but when occasion demands the handle may be detached from its clamping member 43 and manipulated as a hand lamp.

Having thus described my invention what I claim as new and desire to secure by Letters Patent is:

1. A manually portable search light or signal light comprising an electric lamp, a reflector having a rearwardly extending stem, a handle on said reflector, a storage battery, a flexible conductor connecting said battery to said light, a supporting stand mounted upon said storage battery and means for detachably connecting said reflector to said stem.

2. The combination with a search-light comprising a reflector having a rearwardly extending stem, a handle thereon, a storage battery, a flexible conductor connecting said battery to said light through said handle, a supporting stand mounted upon said storage battery and means for detachably connecting said reflector to said stem.

3. In combination with a search-light comprising a reflector having a rearwardly extending stem, a handle thereon, of a supporting stand, a member hinged upon said stand, a clamp having a stem rotatably mounted in said member, said clamp being adapted to engage said stem and means for detachably connecting the members of said clamp.

4. The combination with a search-light comprising a reflector having a rearwardly extending stem having a handle thereon, of a supporting stand, a member hinged thereon, means rotatably mounted in said hinged member adapted detachably to engage said stem, means for causing frictional engagement between said hinged member and said stand and means for causing frictional engagement between the hinged member and the rotatable member to prevent free movement of said members whereby the searchlight may be rigidly positioned to cast its rays in any direction.

5. In combination with a search-light comprising a reflector having a rearwardly extending stem, a handle on said stem, a clamp detachably connected to said stem comprising hinged members adapted to embrace said stem and means for detachably securing the members of said clamp together whereby the search light may be detached from such clamp, a supporting stand, universal connections between said stand and said clamp, means for causing relative engagement of the members of said universal connection to maintain the search light in any desired position.

6. A search light comprising a source of light and a reflector having a rearwardly disposed stem, a flanged reinforcing collar surrounding said stem and attached to said reflector, a sleeve inclosing said collar and secured thereto and to said reflector and means for manipulating said light secured to said stem.

7. An electric lamp, a reflector therefor having a rearwardly disposed stem, a reinforcing collar secured to said reflector and adjustably mounted upon said stem, a sleeve inclosing said reinforcing collar and secured thereto and to said reflector and a check nut mounted upon said stem and adapted to secure the same in adjusted position.

In testimony whereof, I have signed my name to this specification, in the presence of two subscribing witnesses.

ROLAND L. SMITH.

Witnesses:
 FREDERICK A. TENNANT,
 THOMAS J. DRUMMOND